United States Patent
Fears et al.

(10) Patent No.: US 10,391,466 B2
(45) Date of Patent: Aug. 27, 2019

(54) FABRICATION OF NANOPOROUS AEROGELS VIA FREEZE SUBSTITUTION OF NANOWIRE SUSPENSIONS

(71) Applicant: LAWRENCE LIVERMORE NATIONAL SECURITY, LLC, Livermore, CA (US)

(72) Inventors: Tyler M. Fears, Pleasanton, CA (US); Jeffrey D. Colvin, Pleasanton, CA (US); Sergei O. Kucheyev, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 141 days.

(21) Appl. No.: 15/612,702

(22) Filed: Jun. 2, 2017

(65) Prior Publication Data

US 2018/0345240 A1    Dec. 6, 2018

(51) Int. Cl.
  *B01J 13/00*    (2006.01)
(52) U.S. Cl.
  CPC .................. *B01J 13/0091* (2013.01)
(58) Field of Classification Search
  CPC .................................................. B01J 13/0091
  See application file for complete search history.

(56) References Cited

U.S. PATENT DOCUMENTS

| | | | | |
|---|---|---|---|---|
| 5,230,219 A * | 7/1993 | Ichikawa | .................. | G01N 1/44 |
| | | | | 62/264 |
| 5,409,683 A * | 4/1995 | Tillotson | .............. | B01J 13/0091 |
| | | | | 423/338 |
| 6,326,030 B1 | 12/2001 | Schoenfeldt et al. | | |
| 6,796,366 B2 * | 9/2004 | Roche | ..................... | B22C 9/126 |
| | | | | 164/516 |
| 8,911,859 B1 * | 12/2014 | Spatcher | ............... | C01B 32/168 |
| | | | | 428/315.7 |
| 9,269,502 B2 * | 2/2016 | Chang | ................... | H01G 11/24 |
| 2010/0092371 A1 * | 4/2010 | Backov | ............... | B01J 13/0091 |
| | | | | 423/460 |
| 2010/0187484 A1 * | 7/2010 | Worsley | ................. | B82Y 30/00 |
| | | | | 252/510 |
| 2010/0189991 A1 * | 7/2010 | Lytle | ...................... | C04B 35/52 |
| | | | | 428/315.5 |
| 2010/0267541 A1 * | 10/2010 | Satcher, Jr. | .......... | B01J 13/0091 |
| | | | | 501/87 |
| 2011/0124790 A1 * | 5/2011 | Penicaud | .............. | A61L 27/443 |
| | | | | 524/424 |
| 2011/0143202 A1 * | 6/2011 | Farmer | ............... | H01M 4/0416 |
| | | | | 429/218.1 |

(Continued)

OTHER PUBLICATIONS

Gao et al. (Angew. Chem. Int. Ed. 2014, 53, 4561-4566) (Year: 2014).*

(Continued)

*Primary Examiner* — Liam J Heincer
(74) *Attorney, Agent, or Firm* — Eddie E. Scott

(57) ABSTRACT

A method of making a nanoporous aerogel includes the steps of providing nanowire suspensions, freeze casting the nanowire suspensions to produce freeze-cast gels, extracting the frozen medium from the freeze-cast gels by freeze-substitution with a solvent to produce wet gels, modifying or functionalizing the wet gels as needed, and drying the wet gels to produce a nanoporous aerogel.

13 Claims, 7 Drawing Sheets

(56) References Cited

U.S. PATENT DOCUMENTS

| | | | |
|---|---|---|---|
| 2012/0171488 A1* | 7/2012 | Yeo | B01J 13/0091 |
| | | | 428/401 |
| 2012/0301360 A1* | 11/2012 | Meinhold | B01J 20/28047 |
| | | | 422/68.1 |
| 2013/0202890 A1* | 8/2013 | Kong | H01B 1/02 |
| | | | 428/402 |
| 2013/0253119 A1* | 9/2013 | Kim | C08L 33/12 |
| | | | 524/430 |
| 2014/0012034 A1* | 1/2014 | Shaffer | B01J 13/0091 |
| | | | 560/56 |
| 2014/0127490 A1* | 5/2014 | Islam | B82Y 30/00 |
| | | | 428/219 |
| 2014/0134415 A1* | 5/2014 | Gong | C08J 9/28 |
| | | | 428/219 |
| 2015/0004521 A1* | 1/2015 | Ramesh | B28B 1/007 |
| | | | 429/479 |
| 2015/0284258 A1* | 10/2015 | Fears | C01G 31/02 |
| | | | 427/240 |
| 2016/0101398 A1* | 4/2016 | Worsley | B01J 13/0091 |
| | | | 106/122 |
| 2018/0112054 A1* | 4/2018 | Steiner, III | C08J 9/28 |
| 2018/0198117 A1* | 7/2018 | Tiquet | H01M 4/139 |
| 2018/0327548 A1* | 11/2018 | Kotake | C01B 33/158 |

OTHER PUBLICATIONS

Feder et al. (J. Biophysic. and Biochem. Cytol., 1958, vol. 4, No. 5, 593-602) (Year: 1958).*
Tang et al. (J. Mater. Chem. A, 2013, 1, 6723-6726) (Year: 2013).*

* cited by examiner

FABRICATION OF NANOPOROUS AEROGELS VIA FREEZE SUBSTITUTION OF NANOWIRE SUSPENSIONS

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to nanowire suspensions and more particularly to fabrication of nanoporous aerogels via freeze substitution of nanowire suspensions.

State of Technology

This section provides background information related to the present disclosure which is not necessarily prior art.

U.S. Pat. No. 6,326,030 for a method for preparing a non-fibrous porous material issued Dec. 4, 2001 provides the state of technology information quoted below.
"A method for preparing a non-fibrous porous material essentially consisting of one or more hydrophilic polymers and/or pharmaceutical medicaments comprising forming an aqueous solution, sol or gel comprising one or more hydrophilic polymers and/or pharmaceutical medicaments, freezing the solution, sol or gel and extracting the frozen water selectively using a hydrophilic organic solvent being miscible with water at a temperature below 5° C. at which temperature the solvent is not able to dissolve the frozen solutes, leaving the non-fibrous material in a solid, porous form."

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed, and the application covers all modifications, equivalents, and alternatives falling within the spirit and scope of the apparatus, systems, and methods as defined by the claims.

New methods are needed to produce nanoporous materials with new elemental compositions, new form factors, and reduced costs. Inventors' apparatus, systems, and methods utilize freeze-casting of nanowire suspensions to form freeze-cast gels followed by extraction of the frozen medium by freeze substitution with an appropriate solvent. The solvent in resultant wet gels is removed in the final drying step. In this disclosure, "nanowire" can refer to any high-aspect-ratio object such as elongated nanoparticles, fibers, and objects with more complex geometries. This method allows for the use of suspension media not amenable to conventional freeze drying and of nonvolatile solvent compositions that are desirable to achieve superior foam morphologies and to reduce sample deformation and fracture during freeze-casting. In contrast to the limitations of the conventional freeze-drying method, in the method disclosed in this invention, freeze-cast gels and wet gels are not subject to damaging gravitational forces during freeze substitution and solvent drying steps. Microstructural stresses are reduced during freeze-substitution as compared to freeze drying, resulting in negligible sample shrinkage and excellent mold replication. The freeze-substitution stage also allows for chemical modification and functionalization of the gels (such as ligand exchange) prior to drying. Such chemical modification and functionalization are not possible in traditionally freeze-dried gels.

Inventors' apparatus, systems, and methods include the following steps: providing nanowire suspensions, freeze casting the nanowire suspensions to produce freeze-cast gels, extracting the frozen medium from freeze-cast gels by freeze-substitution of the frozen medium with a solvent to produce wet gels, and drying the wet gels by one of the conventional gel drying methods to produce a nanoporous aerogel. Inventors' apparatus, systems, and methods have many advantages, including the following:
  they produce a uniform aerogel,
  they are applicable to a wide variety and elemental compositions of nanoporous aerogels, including pure metal aerogels and multicomponent aerogels made from nanowires with different elemental composition,
  complex geometries of parts are made possible via the use of molds that can also include soluble mold components removable during the solvent extraction step,
  the freeze-substitution step of the fabrication process allows the use of suspension media and nonvolatile components that not amenable to conventional freeze drying, and
  before the drying step to remove the solvent from wet gels, chemical modification of aerogels can be performed, such as ligand exchange and surface functionalization; this is not possible in the conventional freeze drying process.

Inventors' apparatus, systems, and methods have many uses. For example, inventors' apparatus, systems, and methods can be used to fabricate ultra-low-density nanoporous components of targets for laser-driven X-ray sources, laser-driven ion sources, and laser-driven neutron sources. Also, the inventors' apparatus, systems, and methods can be used for automotive lightweighting, energy absorption, thermal management, catalyst materials and supports, capacitors, and nanoporous material components of fuel targets for inertial confinement fusion energy applications. In one embodiment, the inventors' apparatus, systems, and methods can be used for making silver aerogels for antimicrobial scaffolds in medical implants.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
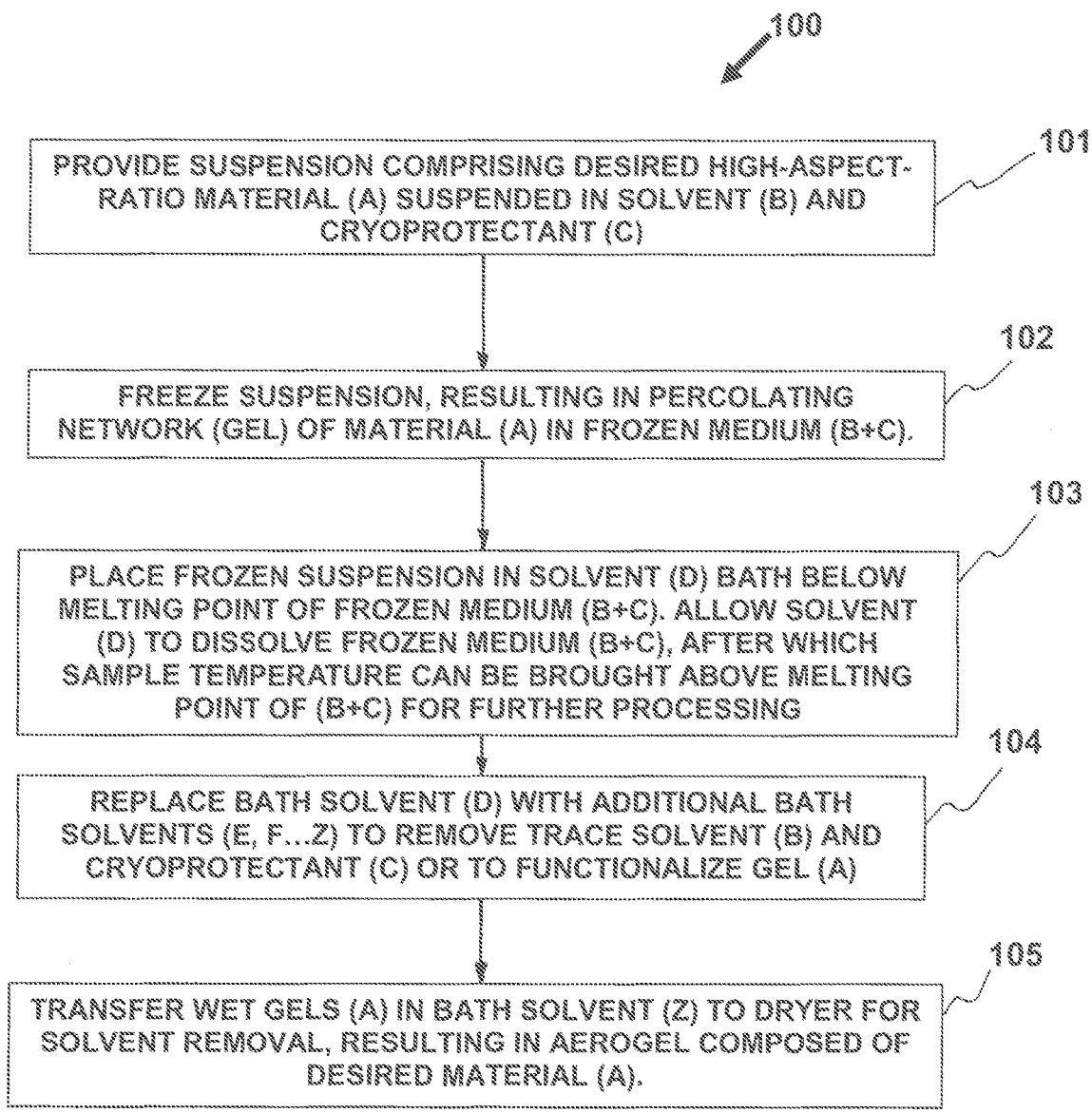
FIG. 1 is a flow chart illustrating one embodiment of the inventors' apparatus, systems, and methods for fabricating nanowire aerogels.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Ultra-low-density (ULD) (<20 mg/cm$^3$) materials with micron and submicron feature sizes are desirable for a variety of niche applications. There are few materials, however, that can be fabricated into useful geometries at such low densities with high uniformity and reproducibility. Prototypical ultra-low-density materials either rely on multistep chemical methods (SiO$_2$) or the complex fabrication and removal of nanostructured scaffolds (C, NiP). Furthermore, these methods are intrinsically limited to a small number of materials with appropriate chemistries.

Suspensions of nanomaterials can be used to form aerogels by spontaneously gelling above their percolation threshold, which, for 1-D materials, is proportional to the inverse of their aspect ratio. In practice, for unknown reasons, this has proven difficult. Alternatively, a method based on freeze-casting of particulate suspensions followed by a freeze-drying step has been shown to be useful for fabricating porous materials with a wide variety of compositions, densities, and feature sizes. During the freeze-casting of a nanoparticulate suspension, a percolating particulate network (gel) assembles at grain boundaries formed during solvent crystallization. A nanoporous aerogel can then be made by removing the frozen medium via conventional freeze-drying. ULD materials are still difficult to fabricate via this method as physical forces encountered during freeze drying often damage the necessarily fragile porous network. By utilizing suspensions of high aspect ratio nanowires and employing freeze-casting followed by low-temperature extraction of the frozen solvent by freeze-substitution and supercritical drying steps, the inventors have been able to fabricate monolithic, nanoporous Ag aerogels with monolith densities below 3 mg/cm$^3$. The physical (rather than chemical) nature of this method suggests that it could be used to fabricate a number of desired, previously unrealized ULD materials. With this new method, the inventors have demonstrated the fabrication of aerogels from Ag, Cu, and Au nanowires.

Referring now to the drawings, and in particular to FIG. 1, a flow chart illustrates one embodiment of the inventors' apparatus, systems, and methods. This embodiment of the inventors' apparatus, systems, and methods is designated generally by the reference numeral 100. The embodiment 100 is a general process for fabricating freeze-cast nanowire aerogels with frozen medium extraction by freeze-substitution that includes the steps described below.

Step 101—Provide suspension comprising desired high-aspect-ratio material (A) suspended in solvent (B) and cryoprotectant (C).

Step 102—Freeze suspension, resulting in percolating network (gel) of material (A) in frozen medium (B+C).

Step 103—Place frozen suspension in solvent (D) bath below melting point of frozen medium (B+C). Allow solvent (D) to dissolve frozen medium (B+C), after which sample temperature can be brought above melting point of (B+C) for further processing.

Step 104—Replace bath solvent (D) with additional bath solvents (E, F . . . Z) to remove trace solvent (B) and cryoprotectant (C) or to functionalize gel (A).

Step 105—Transfer wet gels (A) in bath solvent (Z) to dryer for solvent removal, resulting in aerogel.

Figure 2:
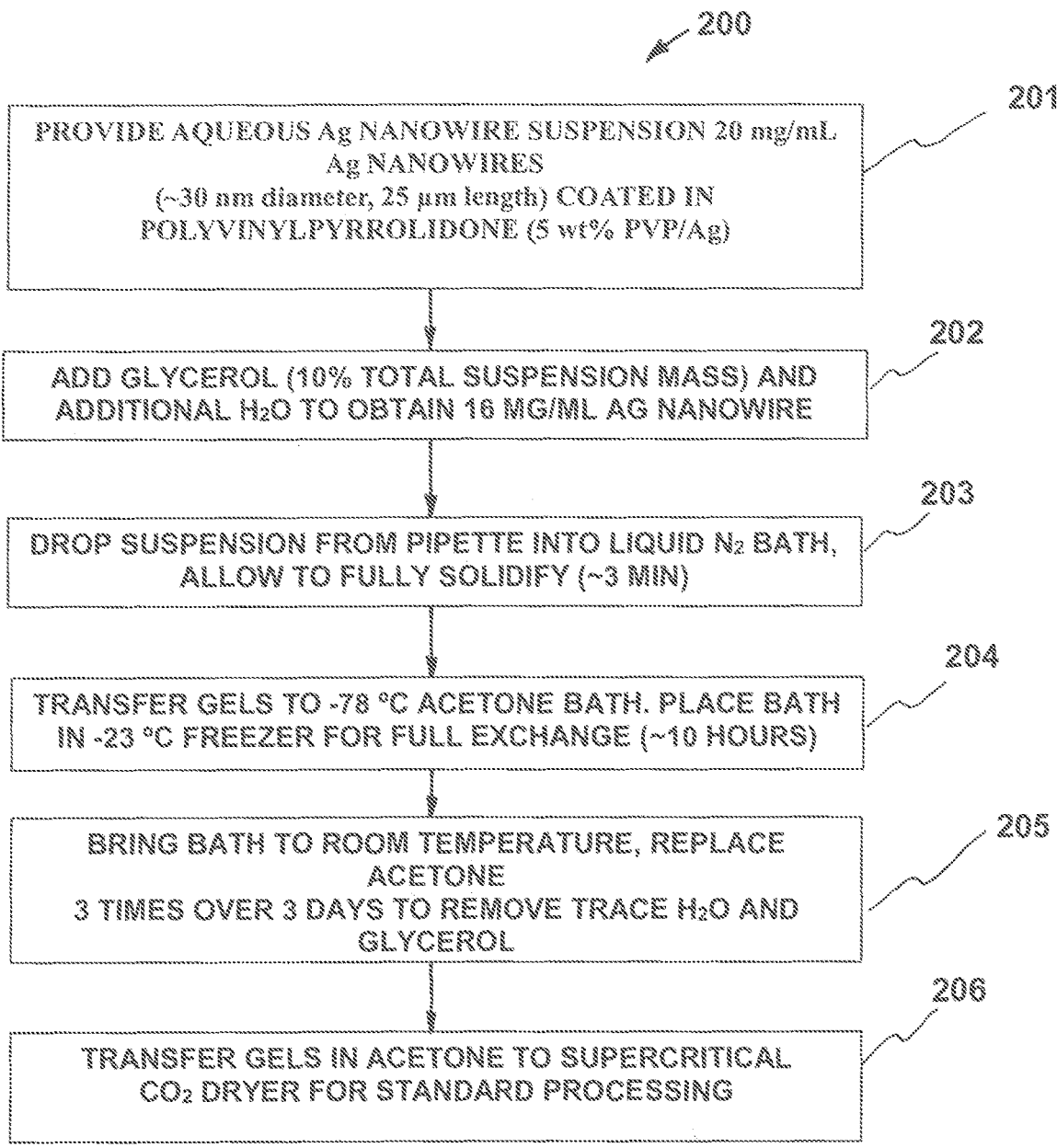
FIG. 2 is a flow chart illustrating a specific embodiment of the inventors' apparatus, systems, and methods for fabricating spherical Ag nanowire aerogels from an aqueous suspension of Ag nanowires.

Referring now to FIG. 2, a flow chart illustrates another specific embodiment of the inventors' apparatus, systems, and methods. This embodiment of the inventors' apparatus, systems, and methods is designated generally by the reference numeral 200. The embodiment 200 is a process for fabricating 16 mg/cm$^3$ spherical Ag nanowire aerogels that includes the steps described below.

Step 201—Provide aqueous Ag nanowire suspension. 20 mg/mL Ag nanowires (~30 nm diameter, 25 μm length) coated in polyvinylpyrrolidone (5 wt % PVP/Ag).

Step 202—add glycerol (10% total suspension mass) and additional H$_2$O to obtain 16 mg/mL Ag nanowire suspension.

Step 203—Drop suspension from pipette into liquid N$_2$ bath, allow to fully solidify (~3 min).

Step 204—Transfer gels to −78° C. acetone bath. Place bath in −23° C. freezer for full exchange (~10 hours).

Step 205—Bring bath to room temperature, replace acetone 3 times over 3 days to remove trace H$_2$O and glycerol.

Step 206—Transfer gels in acetone to supercritical CO$_2$ dryer for standard processing.

Referring now to the FIGS. 3-6 of the drawings, the embodiment of the inventors' apparatus, systems, and methods 100 and 200 is illustrated and described in greater detail.

Figure 3:
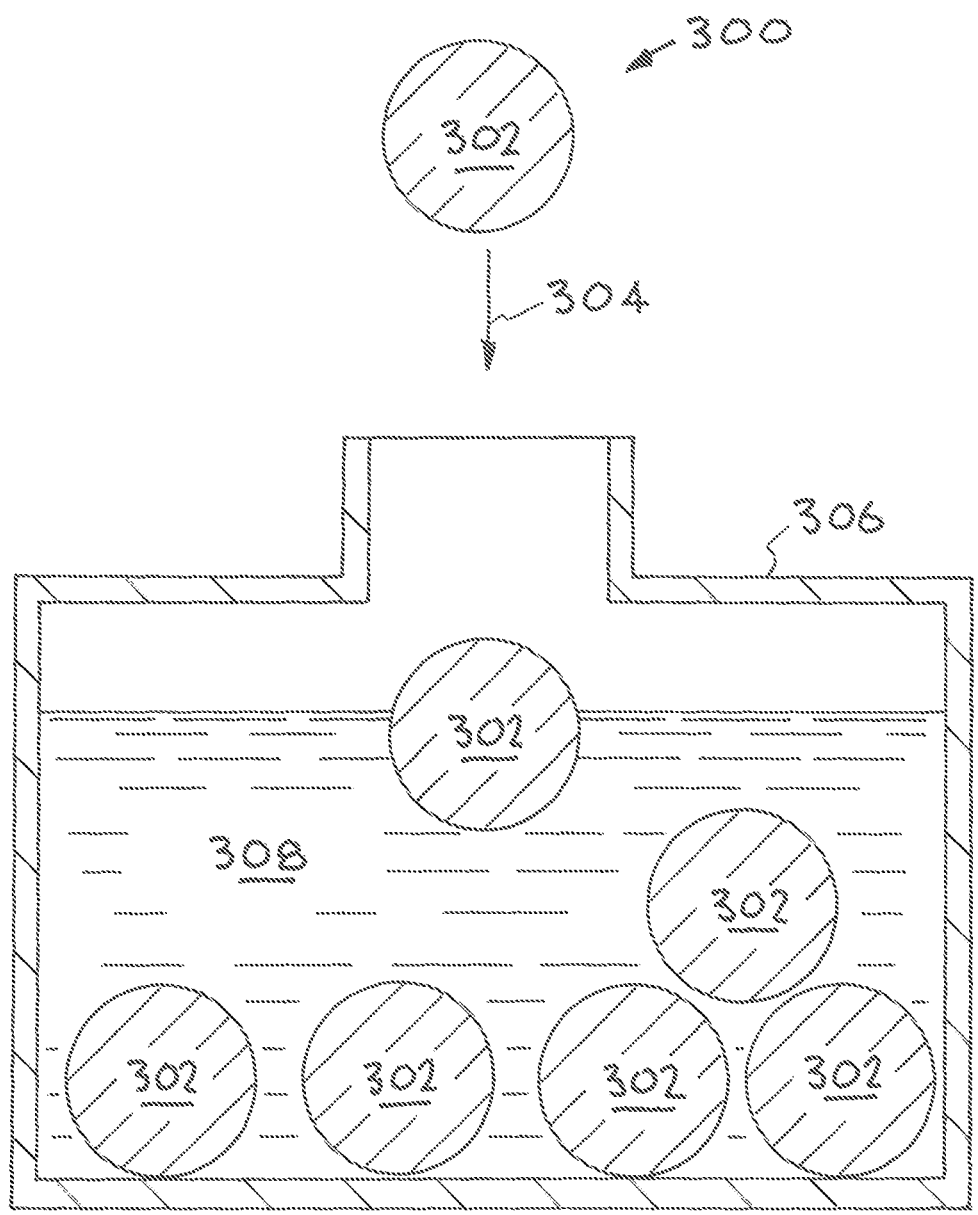
FIG. 3 illustrates the steps of providing nanowires and freeze casting droplets of the nanowire suspension to produce spherical freeze-cast gels.
Figure 4:
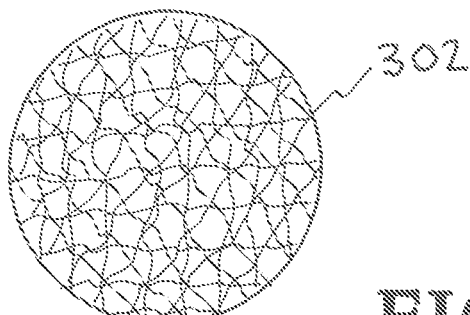
FIG. 4 is an illustration of a spherical freeze-cast gel.

FIG. 3 shows the step of providing nanowire suspensions and the step of freeze casting the nanowires to produce spherical freeze-cast gels. FIG. 3 is designated generally by the reference numeral 300. In FIG. 3, the step of providing nanowire suspensions is illustrated by a liquid droplet of a nanowire suspension 302. The nanowire suspension 302 is cryogenically cooled by being placed in a cryogenic bath 306. The arrow 304 illustrates the nanowire suspension 302 being placed in a bath of cryogenic liquid 308 to produce freeze-cast gels 302. The freeze-cast gels 302 are illustrated in FIG. 4.

Figure 5:
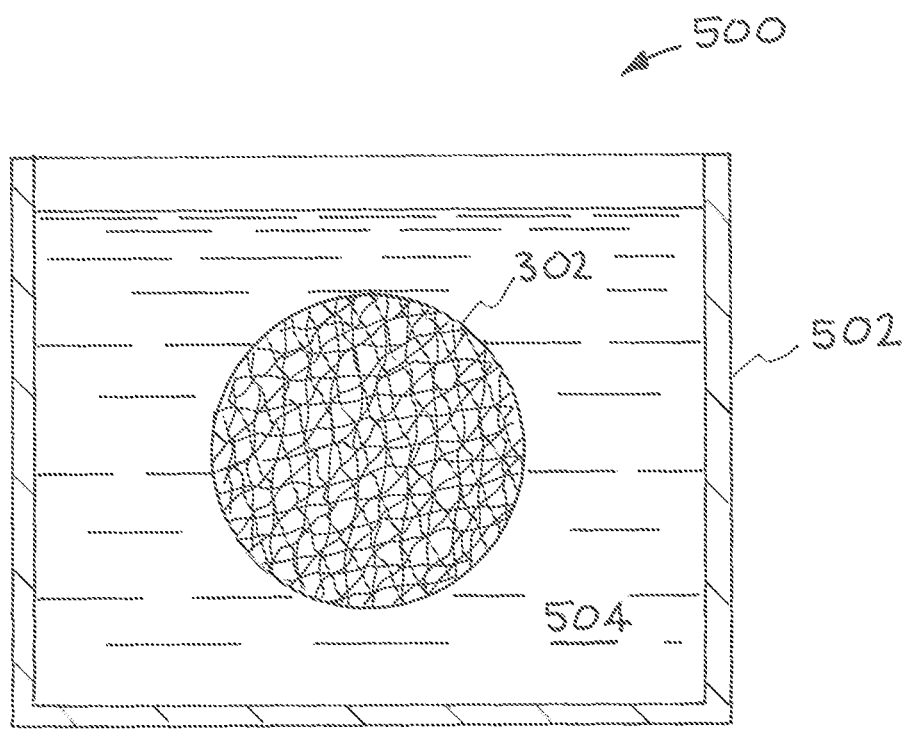
FIG. 5 illustrates the step of extracting the frozen medium from freeze-cast gels by freeze-substitution with a solvent to produce wet gels.

FIG. 5 shows the step of extracting the frozen medium from freeze-cast spherical gels by freeze substitution in a solvent to produce wet gels. FIG. 5 is designated generally by the reference numeral 500. In FIG. 5, the step of extracting the frozen medium from freeze-cast gels by freeze-substitution with a solvent is illustrated by the freeze-cast gel 302 being cooled in a container 502 of solvent 504.

Figure 6:
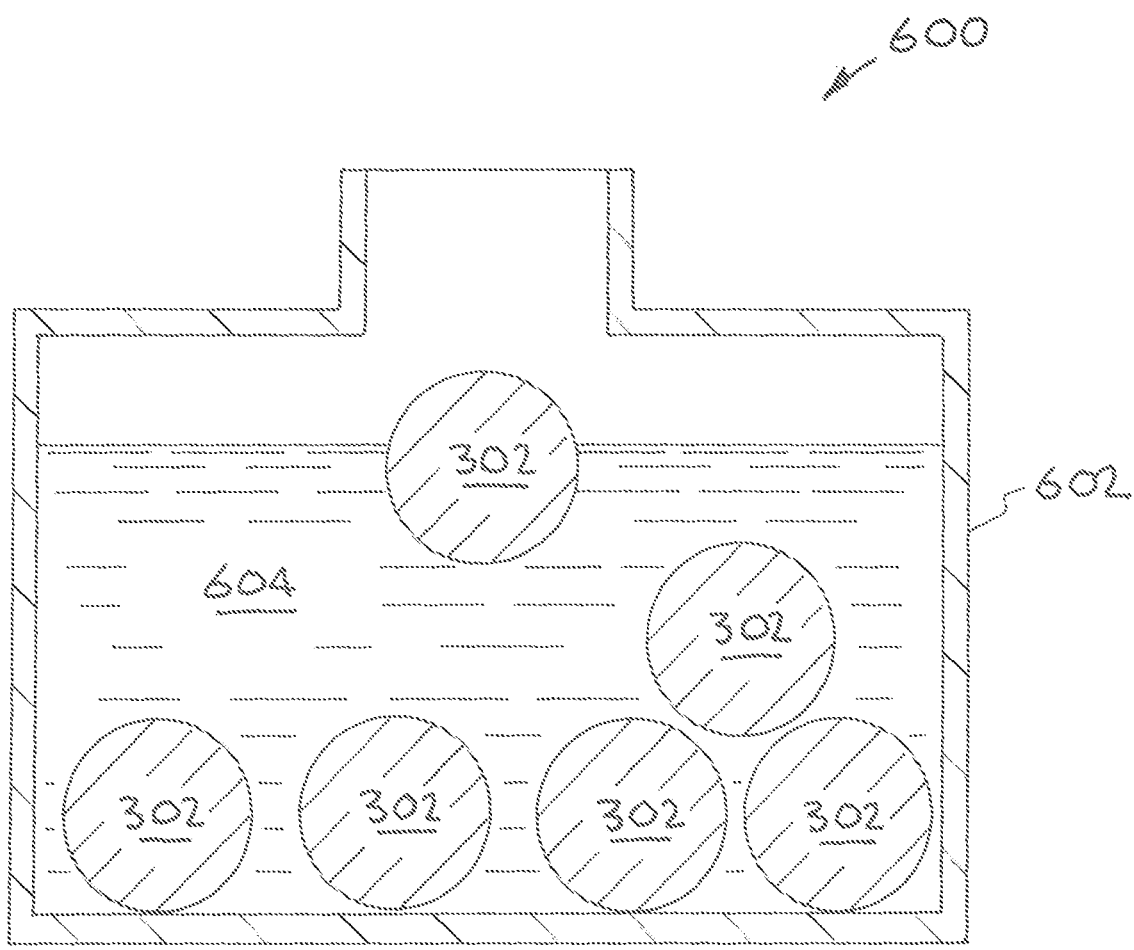
FIG. 6 illustrates the step of supercritically drying the wet gels to produce nanoporous aerogels.

FIG. 6 illustrates the step of drying the wet gel to produce the nanoporous aerogel. Wet gels 302 are dried via one of the standard drying procedures. For example, during supercritical drying, wet gels 302 are placed in a pressure vessel 602 in a bath of flowing $CO_2$ 604 for solvent exchange followed by the venting of $CO_2$ 604 under supercritical conditions.

Figure 7:
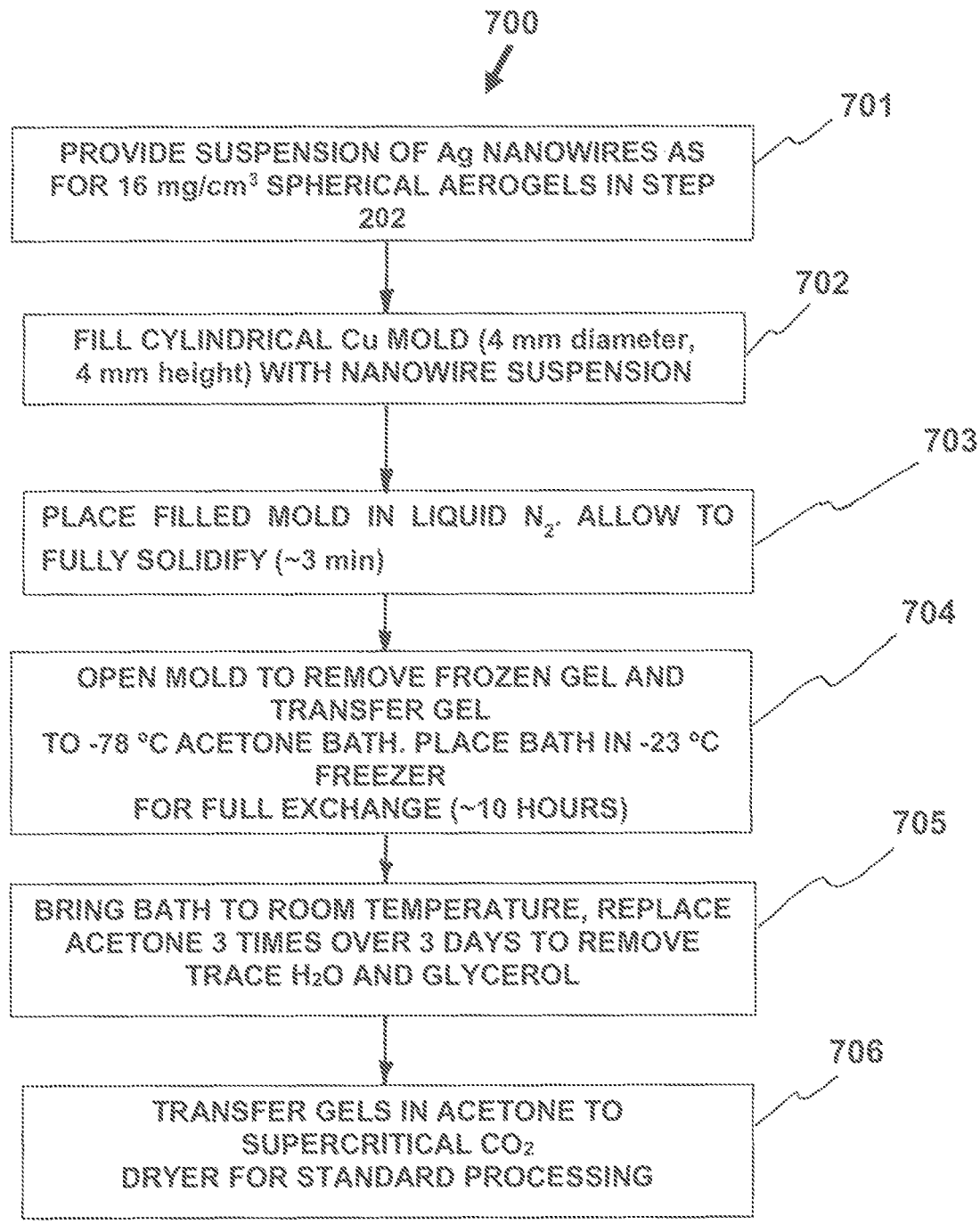
FIG. 7 is a flow chart illustrating another embodiment of the inventors' apparatus, systems, and methods for fabricating cylindrical Ag nanowire aerogels from an aqueous suspension of Ag nanowires.

Referring now to FIG. 7, a flow chart illustrates another embodiment of the inventors' apparatus, systems, and methods in which cylindrical ULD Ag nanowire aerogels are fabricated from an aqueous suspension of Ag nanowires by freeze-casting in cylindrical molds with high thermal conductivity. This embodiment of the inventors' apparatus, systems, and methods is designated generally by the reference numeral 700. The embodiment 700 includes the steps described below.

Step 701—provide a Ag nanowire suspension as in Step 202.

Step 702—fill cylindrical molds with the said nanowire suspension.

Step 703—freeze cast the said nanowire suspension by placing the molds in a cryogenic bath.

Step 704—disassemble the molds to remove the freeze-cast gels and transfer said freeze-cast gels to a solvent bath for freeze-substitution of the frozen medium with the solvent to produce wet gels.

Step 705—process wet gels in preparation for supercritical drying.

Step 706—supercritically dry said wet gels to produce the nanoporous aerogels.

Figure 8:
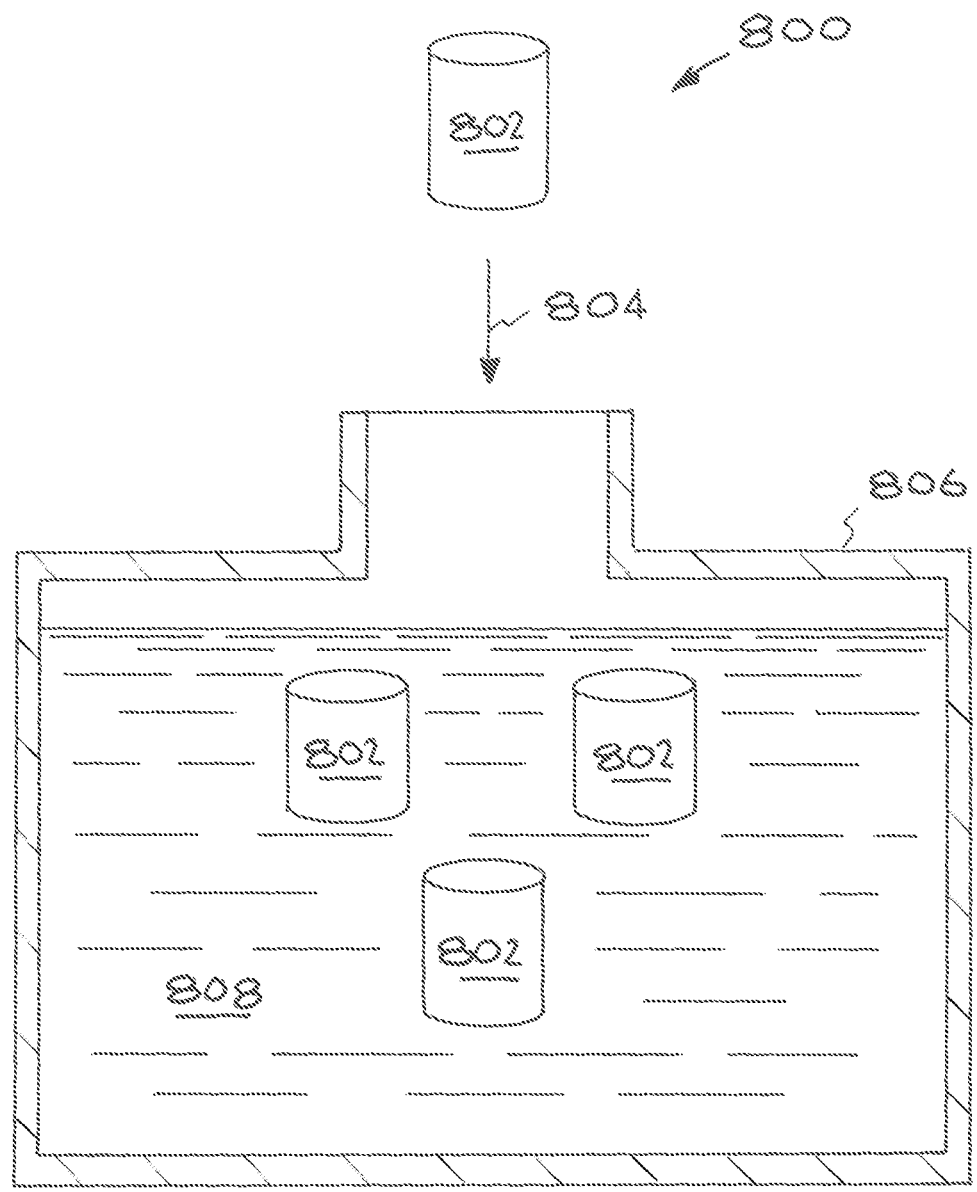
FIG. 8 illustrates the steps of providing nanowires and freeze casting the nanowires to produce cylindrical freeze-cast gels.

Referring now to FIG. 8 of the drawings, an embodiment of the inventors' apparatus, systems, and methods 800 is illustrated and described. This embodiment of the inventors' apparatus, systems, and methods is designated generally by the reference numeral 800. FIG. 8 illustrates the step of freezing nanowire suspensions 802 in a mold having a desired shape such as cylindrical. The nanowire suspensions 802 are cryogenically cooled by being placed in a cryogenic bath 806. The arrow 804 illustrates the nanowire suspensions 802 being placed in a bath 806 of cryogenic liquid 808 to produce a freeze-cast nanowire suspensions.

Additional embodiments of the above method include but are not limited to the use of high melting point (close to or above room temperature) solvents, non-elemental and composite nanowires, chemical modification of gels between the freeze substitution and solvent drying steps, and alternative drying strategies such as freeze drying or ambient drying. Another embodiment includes making parts via freeze-casting by injection molding and extrusion of nanowire suspensions with or without additives that modify the viscosity of the nanowire suspension. Another embodiment includes the omission of the final solvent drying step and the direct use of wet gels in applications that require wetted porous materials, e.g., porous electrodes and catalytic materials.

Although the description above contains many details and specifics, these should not be construed as limiting the scope of the application but as merely providing illustrations of some of the presently preferred embodiments of the apparatus, systems, and methods. Other implementations, enhancements, and variations can be made based on what is described and illustrated in this patent document. The features of the embodiments described herein may be combined in all possible combinations of methods, apparatus, modules, and systems. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A method of making a nanoporous aerogel, comprising:
provide a liquid droplet of a nanowire suspension,
provide a cryogenic bath,
freeze cast said nanowire suspension by placing said liquid droplet of a nanowire suspension in said cryogenic bath to produce a spherical freeze-cast gel wherein said spherical freeze-cast gel contains a frozen medium, provide a container of solvent, extract said frozen medium from said spherical freeze-cast gel by freeze-substitution by cooling said spherical freeze-cast gel in said container of solvent to produce a spherical wet gel, and dry said spherical wet gel to produce the nanoporous aerogel.

2. The method of making a nanoporous aerogel of claim 1 wherein said step of drying said spherical wet gel comprises providing a pressure vessel containing a bath of flowing carbon dioxide, placing said spherical wet gel in said bath of flowing carbon dioxide, and venting said carbon dioxide under supercritical conditions.

3. The method of making a nanoporous aerogel of claim 1 wherein said step of providing a liquid droplet of a nanowire suspension comprises providing a liquid droplet of a nanowire suspension comprising a nanowire suspension of carbon nanotubes.

4. The method of making a nanoporous aerogel of claim 1 wherein said step of providing a liquid droplet of a nanowire suspension comprises providing a liquid droplet of a nanowire suspension comprising a nanowire suspension of metal nanowires.

5. The method of making a nanoporous aerogel of claim 1 wherein said step of providing a liquid droplet of a nanowire suspension comprises providing a liquid droplet of a nanowire suspension comprising an aqueous metal nanowire suspension.

6. The method of making a nanoporous aerogel of claim 5 wherein said step of providing a liquid droplet of a nanowire suspension comprising an aqueous metal nanowire suspension comprises providing a liquid droplet of a nanowire suspension comprising an aqueous silver nanowire suspension.

7. The method of making a nanoporous aerogel of claim 1 wherein said step of providing a liquid droplet of a nanowire suspension comprises providing a liquid droplet of a nanowire suspension comprising a non-aqueous metal nanowire suspension.

8. The method of making a nanoporous aerogel of claim 7 wherein said step of providing a non-aqueous metal nanowire suspension comprises providing a non-aqueous gold nanowire suspension.

9. The method of making a nanoporous aerogel of claim 7 wherein said step of providing a non-aqueous metal nanowire suspension comprises providing a non-aqueous copper nanowire suspension.

10. The method of making a nanoporous aerogel of claim 1 wherein said step of freeze casting said nanowire suspension to produce a spherical freeze-cast gel comprises placing said liquid droplet of nanowire suspension in said cryogenic bath comprises placing said liquid droplet of nanowire suspension in a cryogenic liquid to produce a spherical freeze-cast gel.

11. The method of making a nanoporous aerogel of claim 1 wherein said step of freeze casting said nanowire suspension to produce a spherical freeze-cast gel comprises placing said nanowires liquid droplet of nanowire suspension in liquid nitrogen to produce a spherical freeze-cast gel.

12. The method of making a nanoporous aerogel of claim 1 wherein said step of extracting said spherical freeze-cast gel in a solvent to produce a spherical wet gel comprises extracting said spherical freeze-cast gel in acetone below −20° C. to produce a spherical wet gel.

13. A method of making a nanoporous Ag aerogel, comprising:

provide aqueous Ag;

add glycerol and water to said aqueous Ag;

provide a liquid droplet of said aqueous Ag, glycerol, and water to produce an aqueous Ag, glycerol, and water suspension;

provide a cryogenic bath;

freeze cast said aqueous Ag, glycerol, and water suspension to produce a spherical freeze-cast Ag gel by placing said aqueous Ag, glycerol, and water suspension in said cryogenic bath;

extract said water and said glycerol from said spherical freeze-cast Ag gel by freeze substitution with acetone to produce a spherical Ag wet gel and supercritically dry said spherical Ag wet gel to produce the nanoporous Ag aerogel.

* * * * *